(12) United States Patent
Pijlman

(10) Patent No.: US 12,432,834 B2
(45) Date of Patent: Sep. 30, 2025

(54) LIGHTING CONTROLLER

(71) Applicant: SIGNIFY HOLDING B.V., Eindhoven (NL)

(72) Inventor: Fetze Pijlman, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 125 days.

(21) Appl. No.: 18/026,169

(22) PCT Filed: Sep. 13, 2021

(86) PCT No.: PCT/EP2021/075044
§ 371 (c)(1),
(2) Date: Mar. 14, 2023

(87) PCT Pub. No.: WO2022/053663
PCT Pub. Date: Mar. 17, 2022

(65) Prior Publication Data
US 2023/0363068 A1 Nov. 9, 2023

(30) Foreign Application Priority Data
Sep. 14, 2020 (EP) .................................. 20195882

(51) Int. Cl.
*H05B 47/10* (2020.01)
*H05B 47/125* (2020.01)

(52) U.S. Cl.
CPC .................. *H05B 47/125* (2020.01)

(58) Field of Classification Search
CPC .. H05B 47/105; H05B 47/115; H05B 47/125; H05B 47/135; H05B 47/155; H05B 47/195
See application file for complete search history.

(56) References Cited

U.S. PATENT DOCUMENTS 5,293,097 A   3/1994  Elwell
9,578,708 B2  2/2017  Aliakseyeu et al.
              (Continued)

FOREIGN PATENT DOCUMENTS

WO    2008135942 A1   11/2008
WO    2010100586 A2    9/2010
              (Continued)

OTHER PUBLICATIONS

Creemers, P.T.J., et al., "Acceptable Fading Time of a Granular Controlled Lighting System for Co-Workers in an Open Office," Eindhoven University of Technology, Jan. 2014 (5 Pages).
(Continued)

*Primary Examiner* — Tung X Le

(57) ABSTRACT

The invention provides a lighting controller arranged for controlling a lighting device in response to a presence detected within a detection radius of a presence sensor; characterized in that the lighting controller is configured to: determine a current lighting status of the lighting device indicative of whether the lighting device provides a lighting characteristic; determine a current presence detection status indicative of whether the presence is detected within an initial detection radius of the presence sensor; adapt the initial detection radius of the presence sensor to an adapted detection radius in which a presence is to be detected based on the current lighting status of the lighting device and the current presence detection status. The invention further provides a system comprising said lighting controller, a presence sensor and a lighting device.

11 Claims, 3 Drawing Sheets

(56) References Cited

U.S. PATENT DOCUMENTS

| | | | |
|---|---|---|---|
| 10,156,581 B1* | 12/2018 | Cho .................... G08B 29/24 |
| 10,997,837 B1* | 5/2021 | Skotty ................ H05B 47/115 |
| 2010/0301767 A1* | 12/2010 | Van De Sluis ...... H05B 47/115 |
| | | | 315/294 |
| 2014/0103814 A1* | 4/2014 | Both ..................... H05B 47/16 |
| | | | 315/153 |
| 2015/0156845 A1 | 6/2015 | Park |
| 2015/0208486 A1 | 7/2015 | Yoon |
| 2016/0174339 A1* | 6/2016 | Rajagopalan ........ H05B 47/115 |
| | | | 315/152 |
| 2016/0267322 A1 | 9/2016 | Miura et al. |
| 2017/0303370 A1* | 10/2017 | Pijlman ............. H05B 47/1965 |
| 2018/0098407 A1* | 4/2018 | Kazanchian ......... H05B 47/125 |
| 2018/0168020 A1* | 6/2018 | Casey .................... G06T 7/246 |
| 2019/0394854 A1 | 12/2019 | Xing et al. |
| 2020/0000250 A1* | 1/2020 | Bergman ............... G06Q 30/02 |
| 2021/0127472 A1* | 4/2021 | Alfier .................... H05B 47/14 |

FOREIGN PATENT DOCUMENTS

| | | |
|---|---|---|
| WO | 2014033618 A1 | 3/2014 |
| WO | 2014187717 A1 | 11/2014 |
| WO | 2019166354 A1 | 9/2019 |

OTHER PUBLICATIONS

Wright, Maury, LEDs Magazine Highlights From Lightfair—Lutron (Video), Home, LEDs & SSL Design, Driver ICs, https://www.ledsmagazine.com/leds-ssl-design/driver-ics/article/16696798/leds-magazine-highlights-from-lightfair-lutron-video, Downloaded Nov. 8, 2019 (11 Pages).

* cited by examiner

LIGHTING CONTROLLER

CROSS-REFERENCE TO PRIOR APPLICATIONS

This application is the U.S. National Phase application under 35 U.S.C. § 371 of International Application No. PCT/EP2021/075044, filed on Sep. 13, 2021, which claims the benefit of European Patent Application No. 20195882.4, filed on Sep. 14, 2020. These applications are hereby incorporated by reference herein.

FIELD OF THE INVENTION

The invention relates to a lighting controller arranged for controlling a lighting device in response to a presence detected within a detection radius of a presence sensor. The invention further relates to a lighting system comprising the lighting device, a presence sensor and the mentioned lighting controller. The invention further relates to a lighting installation comprising a plurality of lighting assemblies and the mentioned lighting controller. The present invention further relates to a method of controlling a lighting device in response to a presence detected within a detection radius of a presence sensor; and may further relate to a corresponding computer program product.

BACKGROUND OF THE INVENTION

The built environment becomes more and more equipped with sensing solutions that control lighting devices. A known example thereof is a single presence sensor associated with a lamp, which may trigger the lamp upon detecting a presence (of e.g. an object or a person). Furthermore, the concept of granular dimming employs multiple presence sensors for triggering their respective associated lamps. Such a concept of granular dimming reduces energy consumption, and is widely applied in the built environment, such as in offices and warehouses.

However, in many examples, a presence sensor may not be able to accurately detect presence (such as e.g. motion) at more remote regions of its Field-of-View (or: detection region). The presence detection in such remote regions may therefore be non-continuous, and may render false negatives. To solve this, the concept of granular dimming often employs presence sensors with overlapping Fields-of-View to ensure that presence is detected in the accurately sensed region of at least one of the multiple presence sensors.

Even though this enables that presence may be detected correctly and continuously by at least one presence sensor, said presence may also still be detected in a more remote region of another adjacent presence sensor. This may disadvantageously cause an adjacent lamp, which is associated with the adjacent presence sensor, to turn on and off occasionally.

For example, in a space equipped with a granular dimming lighting installation, a person working in one region of the space may be detected by the presence sensor of that region and may subsequently be provided with task lighting by the corresponding lamp in that region. However, due to the overlapping Fields-of-View of the presence sensors of the granular dimming lighting installation, an adjacent presence sensor of an adjacent region may occasionally detect the person working as well, and hence occasionally turn on an adjacent lamp corresponding to an adjacent region. The non-continuous and occasional switching of the lamp of an adjacent region may be considered as annoying and a technical problem of the working of such a granular dimming lighting installation. This is a clear disadvantage that needs to be addressed in the lighting domain.

SUMMARY OF THE INVENTION

It is an object of the invention to provide an improved lighting controller for controlling a lighting device in response to a presence detected by a presence sensor, which at least alleviates the problems and disadvantages mentioned above, such as e.g. removing undesired light triggers of presence sensors in adjacent regions. Thereto, the invention provides a lighting controller arranged for controlling a lighting device in response to a presence detected within a detection radius of a presence sensor; characterized in that the lighting controller is configured to: determine a current lighting status of the lighting device indicative of whether the lighting device provides a lighting characteristic; determine a current presence detection status indicative of whether the presence is detected within an initial detection radius of the presence sensor; adapt the initial detection radius of the presence sensor to an adapted detection radius in which a presence is to be detected based on the current lighting status of the lighting device and the current presence detection status.

Hence, for each moment in time, the lighting controller is able to determine whether the lighting device provides a lighting characteristic, and whether presence is detected within the initial detection radius of the presence sensor. Based on these two parameters, which are defined by the current lighting status and the current presence detection status, the lighting controller is advantageously configured to adapt the initial detection radius to an adapted detection radius in which a presence is to be detected.

Throughout the application: Said presence being detected may also be phrased as presence being determined. Said presence may be the presence of a person, an animal, or an object (e.g. a robot, a vehicle, or a data tag). Said detection radius may be phrased as detection range. Said detection radius may define a detection area (i.e. e.g. a radius defining a circular area), wherein said detection area may be the projection of the Field-of-View, or detection region, of the presence sensor onto a surface (such as e.g. a floor).

Throughout the application, the presence sensor may comprise a sensitivity, wherein said sensitivity is constant. Said constant may be phrased as constant in time, or at a constant value in time. Said sensitivity being in detecting said presence. Said sensitivity being in detecting said presence within said detection radius. Thus, the sensitivity of the presence sensor may be constant for each respective detection radius, and e.g. constant in time for varying detection radii during the operation of the presence sensor. Hence, the controller is configured to maintain, or keep, said sensitivity constant. Said constant sensitivity may also be a factory set, default feature of said presence sensor.

The above also renders the effect that in a first case the lighting device is (already) providing the lighting characteristic and is detecting the presence, the initial detection radius may be increased to a larger adapted detection radius. Thereby, due to the increased detection radius, the detected presence may be detected more centrally (or: closely) in a detection region of the presence sensor, such that the detected presence is detected more robustly and more accurately.

The above renders the effect that in a second case the lighting device is not (already) providing the lighting characteristic and is not detecting a presence, the initial detection radius may be reduced to a smaller adapted detection radius. Thereby, due to a reduced detection radius, undesired triggers from remote parts of a detection region spanned by the initial detection radius may be eliminated, hence adding more robustness and accuracy to the presence detection.

The above renders the effect that in a third case the lighting device is (already) providing the lighting characteristic, but is (e.g. suddenly) not detecting a presence (anymore), the initial detection radius may be reduced to a smaller adapted detection radius. Thereby, due to a reduced detection radius, undesired (non-continuous and occasional) triggers from remote parts of a detection region spanned by the initial detection radius may be eliminated, hence adding more robustness and accuracy to the presence detection.

Consequently, in the first case, the second case and the third case mentioned above, the adaptability of the detection radius of the presence sensor based on the current lighting status of the lighting device and the current presence detection status clearly resolves the problems of undesired light triggers (or: false negatives) caused by the presence being in remote (inaccurate) regions of the detection region of the presence sensor, which detection region is spanned by the detection radius.

Hence, in a first embodiment, the lighting controller may be configured to: determine a first condition if (i) the current lighting status of the lighting device is indicative of the lighting device providing the lighting characteristic, and (ii) the current presence detection status is indicative of the presence being detected within the initial detection radius of the presence sensor; adapt the initial detection radius of the presence sensor to a first adapted detection radius in which a presence is to be detected upon determining said first condition, wherein the first adapted detection radius is larger than the initial detection radius.

Hence, in a second embodiment, the lighting controller may be configured to: determine a second condition if (i) the current lighting status of the lighting device is indicative of the lighting device not providing the lighting characteristic, and (ii) the current presence detection status is indicative of the presence not being detected within the initial detection radius of the presence sensor; adapt the initial detection radius of the presence sensor to a second adapted detection radius in which a presence is to be detected upon determining said second condition, wherein the second adapted detection radius is smaller than the initial detection radius.

Hence, in a third embodiment, the lighting controller may be configured to: determine a third condition if (i) the current lighting status of the lighting device is indicative of the lighting device providing the lighting characteristic, and (ii) the current presence detection status is indicative of the presence not being detected within the initial detection radius of the presence sensor; adapt the initial detection radius of the presence sensor to a third adapted detection radius in which a presence is to be detected upon determining said third condition, wherein the third adapted detection radius is smaller than the initial detection radius.

In an embodiment, the presence sensor may be characterized as a range sensor. The range sensor may comprise said initial detection radius in which presence may be detected and/or determined. Hence, said range sensor may be configured to detect and/or determine presence within its initial detection radius at a (current) distance. The range sensor may subsequently provide said detected and/or determined (current) distance to the lighting controller. (Or: the lighting controller may obtain, i.e. retrieve or receive, said distance).

In an embodiment, the first adapted detection radius is a maximum detection radius beyond which the presence sensor is physically incapable to detect the presence. Such an embodiment is advantageous, because in the second case mentioned above, the presence sensor may be controlled to its full capability of sensing by increasing the initial detection radius to the maximum detection radius.

In alternative aspects, the initial detection radius and the maximum detection radius may be the same (already). Hence, upon determining the first condition, the initial detection radius may remain the same, or remain the same maximum detection radius.

In an embodiment, the second adapted detection radius and/or the third adapted detection radius may be a minimum detection radius. Said minimum detection radius may be a minimum detection radius for which the presence sensor may operate to sense presence. For example, a PIR sensor may comprise three detection radii for which, and in which presence may be determined. Hence, the smallest detection radius may be the minimum detection radius.

In an embodiment, the first adapted detection radius may be a predetermined first adapted detection radius. In an embodiment, the second adapted detection radius may be a predetermined second adapted detection radius. In an embodiment, the third adapted detection radius may be a predetermined third adapted detection radius. In an embodiment, the predetermined second adapted detection radius may comprise a same value as the predetermined third adapted detection radius. Hence, in such embodiments, the adapted detection radius may respectively be increased or decreased to a predetermined, or predefined, or standardized, value. This may be respectively an upper or lower threshold for the respective adapted detection radius. Establishing such predefined thresholds may be advantageous in standardization and in applications of multiple of such presence sensors according to the invention.

In an embodiment, the first adapted detection radius may be at least one meter larger than the initial detection radius. Additionally, or alternatively, in an embodiment, the second adapted detection radius may be at least one meter smaller than the initial detection radius. Additionally, or alternatively, in an embodiment, the third adapted detection radius may be at least one meter smaller than the initial detection radius. Such embodiments may be advantageous, because increasing or decreasing the detection radius with a step of at least one meter may represent at least one common detected object, such as e.g. a person (of which its respective detected surface may span at least one meter).

In an embodiment, the lighting characteristic may be at least one of: a light intensity, an on/off status, a color, a color temperature, a light direction, a light pattern, a light scene, a light recipe, a light modulation, a light spectrum. Such lighting characteristics may advantageously be provided upon detecting (or determining) presence. For example, the lighting device may be controlled to dim to a higher intensity upon detecting presence. For example, the lighting device may be controlled to provide a light recipe upon detecting an animal. For example, the lighting device may be controlled to provide a light color and/or intensity upon detecting a data tag (such as RFID, NFC, QR, etc.). For example, the lighting device may be controlled to provide a light color upon detecting presence. For example, the lighting device may be controlled to provide a light modulation (e.g. Visible Light Communication, or Li-Fi) upon detecting presence of e.g. an order-picking robot.

In an embodiment, the presence sensor is one of: a PIR sensor, a Time-of-Flight presence sensor, a microwave sensor, an ultrasound sensor, a camera, a radiofrequency-based presence sensor, a thermopile, a single pixel thermopile.

In an embodiment, the lighting controller may be configured to set a hold time during which the lighting device is controlled to provide the lighting characteristic; wherein a duration of the hold time is proportional to a size of the adapted detection radius. Said proportionality may e.g. be linear, or e.g. inversely linear.

In an embodiment, the detection radius of the presence sensor may define a circular detection area or a square detection area. Hence, the detection radius may be defined as, or correspond to an effective radius of shapes of a detection area which are different than circular.

As mentioned, the presence sensor may be a range sensor. Hence, the presence sensor may be configured to determine a distance (relative to the presence sensor) at which the presence is detected within the detection radius. Therefore, in embodiments, the lighting controller may further be configured to: determine a current distance relative to the presence sensor at which the presence is detected within the detection radius of the presence sensor; adapt the initial detection radius of the presence sensor to an adapted detection radius in which a presence is to be detected based on said current distance, the current lighting status of the lighting device and the current presence detection status.

For example, in the embodiments mentioned above wherein presence is being detected within the initial detection radius of the presence sensor, the current distance of said relative to the presence sensor at which the presence is detected within the initial detection radius may be determined, and the initial detection radius may be adapted to a tailored adapted detection radius, wherein said tailored initial detection radius is equal to a value that is 100-140 percent of the current distance, to preferably a value that is 100-120 percent of the current distance.

It is a further object of the invention to provide an improved lighting system (or luminaire), which at least alleviates the problems and disadvantages mentioned above. Thereto, the invention further provides a lighting system comprising a lighting device, a presence sensor, and a lighting controller according to the invention. The advantages and/or embodiments applying to the lighting controller according to the invention may also apply mutatis mutandis to the lighting system (or luminaire) according to the invention.

As partly mentioned before, in an embodiment, the presence sensor is one of: a PIR sensor, a Time-of-Flight presence sensor, a microwave sensor, an ultrasound sensor, a camera, a radiofrequency-based presence sensor, a thermopile (array), a single pixel thermopile.

Such presence sensors may be characterized by their ability to sense presence at a particular detection radius. Such a thermopile sensor or PIR sensor may for example comprise at least two (e.g. three) predefined detection radii at which a presence may be determined, wherein the lighting controller may toggle between these detection radii so as to adapt an initial detection radius to an adapted detection radius for detecting presence. A Time-of-Flight (presence) sensor may for example detect presence within its initial detection radius (or: range), and also provide the current distance at which said presence is detected. The same applies to e.g. a microwave sensor and ultrasound sensor.

It is a further object of the invention to provide an improved lighting installation, such as a lighting installation suitable for the concept of granular dimming, which at least alleviates the problems and disadvantages mentioned above. Thereto, the invention further provides a lighting installation comprising a plurality of lighting assemblies and a lighting controller according to the invention; wherein each lighting assembly of the plurality of lighting assemblies comprises a lighting device and an associated presence sensor; wherein the lighting controller is arranged to control a respective lighting device of each respective lighting assembly of the plurality of lighting assemblies in response to a presence determined within a detection radius of a respective associated presence sensor of the respective lighting assembly. The advantages and/or embodiments applying to the lighting controller and lighting system according to the invention may also apply mutatis mutandis to the lighting installation according to the invention.

The lighting controller may thereby be a distributed lighting controller, wherein each lighting assembly may accommodate a partial lighting controller making up together said lighting controller, or a centralized lighting controller for controlling each lighting assembly.

It is a further object of the invention to provide an improved method of controlling a lighting device in response to a presence detected by a presence sensor, which at least alleviates the problems and disadvantages mentioned above. Thereto, the invention further provides, a method of controlling a lighting device in response to a presence detected within a detection radius of a presence sensor, wherein the method comprises: determining a current lighting status of the lighting device indicative of whether the lighting device provides a lighting characteristic; determining a current presence detection status indicative of whether the presence is detected within an initial detection radius of the presence sensor; adapting the initial detection radius of the presence sensor to an adapted detection radius in which a presence is to be detected based on the current lighting status of the lighting device and the current presence detection status. The advantages and/or embodiments applying to the lighting controller and lighting system according to the invention may also apply mutatis mutandis to the method according to the invention.

In an embodiment, the method may comprise: determining a first condition if (i) the current lighting status of the lighting device is indicative of the lighting device providing the lighting characteristic, and (ii) the current presence detection status is indicative of the presence being detected within the initial detection radius of the presence sensor; adapting the initial detection radius of the presence sensor to a first adapted detection radius in which a presence is to be detected upon determining said first condition, wherein the first adapted detection radius is larger than the initial detection radius.

In an embodiment, the method may comprise: determining a second condition if (i) the current lighting status of the lighting device is indicative of the lighting device not providing the lighting characteristic, and (ii) the current presence detection status is indicative of the presence not being detected within the initial detection radius of the presence sensor; adapting the initial detection radius of the presence sensor to a second adapted detection radius in which a presence is to be detected upon determining said second condition, wherein the second adapted detection radius is smaller than the initial detection radius.

In an embodiment, the method may comprise: determining a third condition if (i) the current lighting status of the lighting device is indicative of the lighting device providing the lighting characteristic, and (ii) the current presence detection status is indicative of the presence not being detected within the initial detection radius of the presence sensor; adapting the initial detection radius of the presence sensor to a third adapted detection radius in which a presence is to be detected upon determining said third condition, wherein the third adapted detection radius is smaller than the initial detection radius.

In an embodiment, the method may comprise: setting a hold time during which the lighting device is controlled to provide the lighting characteristic; wherein a duration of the hold time is proportional to a size of the adapted detection radius.

In an embodiment, the method may comprise: determining a current distance relative to the presence sensor at which the presence is detected within the initial detection radius of the presence sensor; adapt the initial detection radius of the presence sensor to an adapted detection radius in which a presence is to be detected based on said current distance, the current lighting status of the lighting device and the current presence detection status.

The present invention further relates to a computer program product. Hence, the invention provides a computer program product for a computing device, the computer program product comprising computer program code to perform a method according to the invention when the computer program product is run on a processing unit of the computing device.

Thus, aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

In further aspects, the invention provides a controller arranged for controlling an electrical device in response to a presence detected within a detection radius of a presence sensor; characterized in that the lighting controller is configured to: determine a current status of the electrical device indicative of whether the electrical device provides a characteristic; determine a current presence detection status indicative of whether the presence is detected within an initial detection radius of the presence sensor; adapt the initial detection radius of the presence sensor to an adapted detection radius in which a presence is to be detected based on the current status of the electrical device and the current presence detection status. For example: The electrical device may be a lighting device, the status may be a lighting status, the characteristic may be a lighting characteristic. For example: The electrical device may be a sensor, the status may be a sensor status, the characteristic may be a sensor characteristic. Said sensor characteristic may for example be one of: a sensor sensitivity (level), an on or off state of the sensor, a directionality of the sensor. The advantages and/or embodiments applying to the lighting controller according to the invention may also apply mutatis mutandis to the controller according to this further aspect of the invention.

In yet further aspects, the invention provides a lighting system comprising a PIR sensor, a lighting device and a lighting controller, wherein the lighting controller is arranged for controlling the lighting device in response to a presence detected within a detection radius of the PIR sensor; wherein the PIR sensor is configured to detect a presence within the detection radius and provide an output signal; wherein the lighting controller is configured to: obtain the output signal of the PIR sensor; determine a current lighting status of the lighting device indicative of whether the lighting device provides a lighting characteristic; analyze the output signal for determining a current presence detection status indicative of whether the presence is detected within an initial detection radius of the PIR sensor; adapt the initial detection radius of the PIR sensor to an adapted detection radius in which a presence is to be detected based on the current lighting status of the lighting device and the current presence detection status. The advantages and/or embodiments applying to the lighting controller according to the invention may also apply mutatis mutandis to the controller according to yet this further aspect of the invention.

BRIEF DESCRIPTION OF THE DRAWINGS

The invention will now be further elucidated by means of the schematic non-limiting drawings.

DETAILED DESCRIPTION OF THE EMBODIMENTS

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art.

As mentioned before, the lighting controller according to the invention is able to determine whether the lighting device provides a lighting characteristic, and whether presence is detected within the initial detection radius of the presence sensor. Based on these two parameters, which are defined by the current lighting status and the current presence detection status, the lighting controller is advantageously configured to adapt the initial detection radius to an adapted detection radius in which a presence is to be detected. The presence sensor may be characterized as a range sensor.

Consequently, the adaptability of the detection radius of the presence sensor based on the current lighting status of the lighting device and the current presence detection status clearly resolves the problems of undesired light triggers (or: false negatives) caused by the presence being in remote (inaccurate) regions of the detection region of the presence sensor, which detection region is spanned by the detection radius.

Figure 1A:
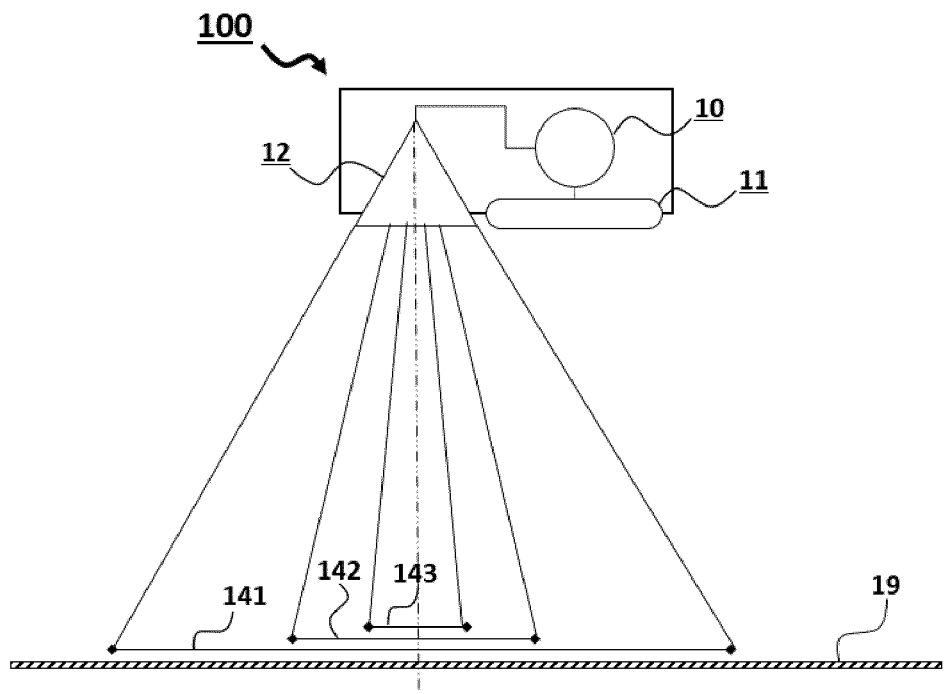
FIGS. 1A-1D depict schematically an embodiment of a lighting system according to the invention, wherein the lighting system comprises a lighting device, a presence sensor and a lighting controller according to the invention.

FIG. 1A depicts schematically, by non-limiting example, a lighting system 100. The lighting system 100 comprises a lighting controller 10, a lighting device 11, and a presence sensor 12. The lighting controller 10, the lighting device 11, and the presence sensor 12 are embodied within a same housing (e.g. within a luminaire), but may alternatively be embodied as separate parts. Moreover, the lighting controller 10 communicates via a wired connection with said lighting device 11 and said presence sensor 12. Alternatively, the lighting controller 10, the lighting device 11, and/or said presence sensor 12 may be communicating wirelessly, e.g. via a ZigBee, Bluetooth, Wi-Fi, RF, IR, Li-Fi, or VLC connection; particularly when said components are embodied as separate parts.

The presence sensor 12 is configured to monitor a detection region in a space. The lighting device 11 is configured to at least partly illuminate said detection region in the space. Here, the space is bound by a surface 19. The surface is a floor 19. The space may for example be an office space, a retail space, or warehouse, etc. The projection of the detection region onto said floor 19 renders a detection area. Hence, the presence sensor 12 is configured to detect presence in said detection area.

More specifically, the detection region (which may e.g. be a volumetric cone) and the detection area (which may e.g. be a circle, or e.g. circular base of said cone) comprise a central axis. The detection region and the detection area can therefore be defined by a detection radius. Hence, the presence sensor is arranged for detecting presence within its detection radius. Said detection radius may also be phrased as detection range. The presence sensor may therefore alternatively be phrased as range sensor as well.

Referring to FIG. 1A, the presence sensor 12 is a thermopile array sensor, but may alternatively by any other presence sensor mentioned before in this application, such as for example a Time-of-Flight sensor. Here, the thermopile array sensor is depicted with three different detection areas (or detection regions), each of which is characterized by a respective detection radius 141, 142, 143 defining the corresponding detection area (or detection region) for detecting a presence. Namely, in a first mode of operation, the presence sensor 12 is configured to detect presence within the first detection radius 141; in a second mode of operation, the presence sensor 12 is configured to detect presence within a second (smaller than the first) detection radius 142; in a third mode of operation, the presence sensor 12 is configured to detect presence within the third (smaller than the second) detection radius 143.

Said detecting may alternatively be phrased as determining, because the presence sensor 12 may still monitor a maximum detection range, i.e. defined by a maximum detection radius beyond which the presence sensor is physically incapable to detect the presence, but may limit the presence detection functionality to one of the three mentioned detection radii. For example, even though the thermopile array sensor 12 may be able to monitor presence in the first detection radius 141, the thermopile array sensor 12 may operate in a mode wherein only presence is determined within the (more central but more accurate) second detection radius 142.

Alternatively, the same may apply to a PIR sensor, which may detect presence (e.g. motion) within its detection radius and output an output signal, which output signal may subsequently be analyzed to determine e.g. a distance, a location, and/or a range at which the presence is detected within the detection radius (or: Field-of-View of the PIR sensor), so as to for example determine whether the detection of the PIR sensor is detected within the initial detection radius or not.

Figure 1B:
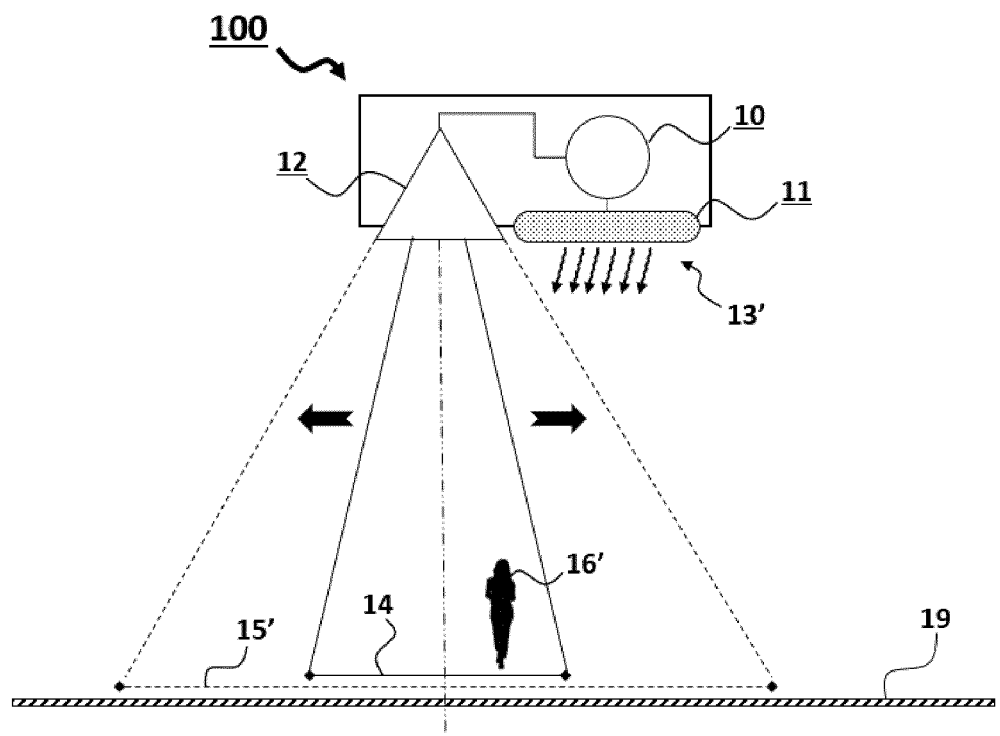
Figure 1C:
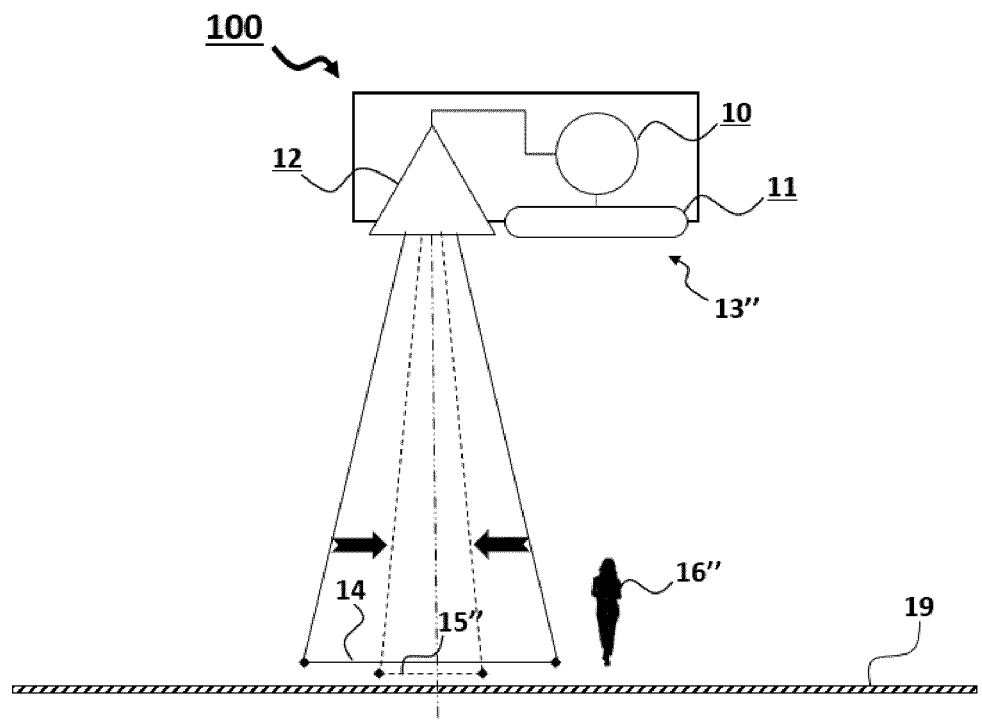
Figure 1D:
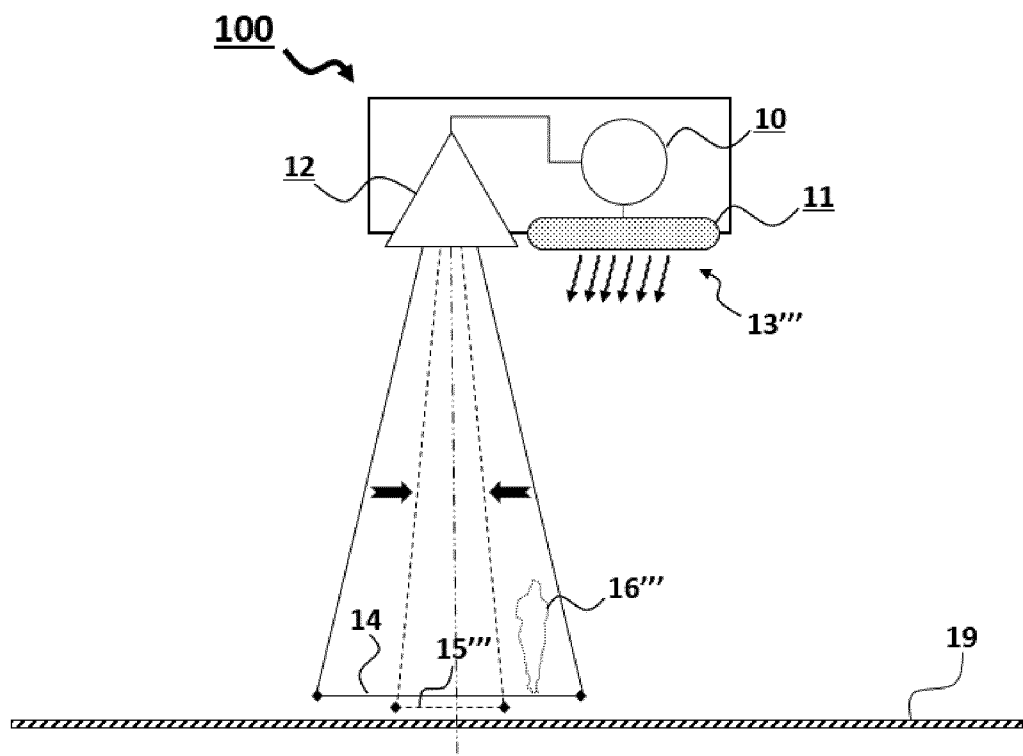

Within this context, the operations of the lighting system according to the embodiment of FIG. 1A is depicted and explained by FIGS. 1B, 1C, and 1D. Thereby, the lighting controller 10 is arranged to control the lighting device 11 in response to a presence detected within a (current) detection radius of the presence sensor 12. The presence of a person 16 is to be detected, although the person may alternatively be an object or an animal, or yet alternatively a beacon signal. In the present preferred embodiment, though optionally, the lighting device 11 is controlled to provide a lighting characteristic for a particular hold time duration upon detecting presence with the presence sensor 12. For example, upon detecting presence, the lighting device 11 may be turned on for one minute, or alternatively any other duration common in application.

FIG. 1B depicts schematically, by non-limiting example, the lighting system 100 according to the embodiment depicted in FIG. 1A. The presence sensor 12 is arranged for detecting presence within a (current) detection radius. The presence to be detected is of a person 16' in said space on said floor 19.

The detection radius of the presence sensor 12 is initially set to an initial detection radius 14. The controller 10 determines a current lighting status of the lighting device 11. The current lighting status of the lighting device 11 is indicative whether the lighting device 11 provides a lighting characteristic 13'. Here, the lighting characteristic 13' is a particular intensity, but may alternatively be any other lighting characteristic mentioned in the application. Here, the lighting device 11 provides said particular intensity (i.e. for the hold time duration). Thus, the current lighting status of the lighting device 11 is indicative of the lighting device 11 providing said lighting characteristic 13'.

The reason why said lighting device 11 is providing said lighting characteristic 13' is because the presence sensor 12 is already detecting (or: determining) the presence of the person 16' within the initial detection radius 14, and consequently the lighting controller 10 controls the lighting device 11 in response thereto, i.e. to provide said lighting characteristic 13' of a particular intensity.

Hence, a current presence detection status, which is indicative whether presence is detected within an initial detection radius 14 of the presence sensor 12, is indeed indicative of presence detected (or: determined) within the initial detection radius 14 of the presence sensor 12.

Therefore, the lighting controller 10 determines a first condition, because the current lighting status of the lighting device 11 indicates that lighting device 11 provides the lighting characteristic 13' and the current presence detection status indicates the presence of the person 16' being detected within the initial detection radius 14 of the presence sensor 12.

Upon determining this first condition, the lighting controller 10 adapts the initial detection radius 14 of the presence sensor 12 to a first adapted detection radius 15' in which presence is (now) to be detected (or: determined). Thus, the detection area spanned by the initial detection radius 14 is adapted to a first adapted detection area spanned by the first adapted detection radius 15'. Thus, the presence sensor 12 is now arranged to detect presence within said first adapted detection radius 15'.

Moreover, corresponding to the determined conditions of said first condition, the first adapted detection radius 15' is larger than the initial detection radius 14. This is advantageous, because due to the increased detection radius to the first adapted detection radius 15', the detected presence may be detected more centrally (or: closely) to the presence sensor 12, such that the detected presence is detected more robustly and more accurately.

Here, the first adapted detection radius 15' is one meter larger than the initial detection radius 14, but may alternatively be any other measure larger, such as at least halve a meter, at least two meter, or at least three meter. In embodiments, the first adapted detection radius may be a maximum detection radius beyond which the presence sensor is physically incapable to detect the presence.

FIG. 1C depicts schematically, by non-limiting example, the lighting system 100 according to the embodiment depicted in FIG. 1A. The presence sensor 12 is arranged for detecting presence within a (current) detection radius. The presence to be detected is of a person 16" in said space on said floor 19.

The detection radius of the presence sensor 12 is initially set to an initial detection radius 14. The person 16" is however outside the initial detection radius 14 of the presence sensor 12. The controller 10 determines a current lighting status of the lighting device 11. The current lighting status of the lighting device 11 is indicative whether the lighting device 11 provides a lighting characteristic 13". Here, the lighting characteristic 13" is a particular intensity, but may alternatively be any other lighting characteristic mentioned in the application. Here, the lighting device 11 does not provide said particular intensity. The lighting device 11 is namely off, as the person 16" is not being detected (or determined) within the initial detection radius 14. Thus, the current lighting status of the lighting device 11 is indicative of the lighting device 11 not providing said lighting characteristic 13" (please note the reference number 13" refers to an empty space, i.e. said lighting characteristic not being present).

As mentioned, the reason why said lighting device 11 is not providing said lighting characteristic is because the presence sensor 12 is not detecting (or determining) the presence of the person 16" within the initial detection radius 14, and consequently the lighting controller 10 controls the lighting device 11 to remain off.

Hence, a current presence detection status, which is indicative whether presence is detected within an initial detection radius 14 of the presence sensor 12, is indicative of presence not detected (or: determined) within the initial detection radius 14 of the presence sensor 12.

Therefore, the lighting controller 10 determines a second condition, because the current lighting status of the lighting device 11 indicates that lighting device 11 does not provide the lighting characteristic 13" and the current presence detection status indicates the presence of the person 16" is not being detected within the initial detection radius 14 of the presence sensor 12.

Upon determining this second condition, the lighting controller 10 adapts the initial detection radius 14 of the presence sensor 12 to a second adapted detection radius 15" in which presence is (now) to be detected (or: determined). Thus, the detection area spanned by the initial detection radius 14 is adapted to a second adapted detection area spanned by the second adapted detection radius 15". Thus, the presence sensor 12 is now arranged to detect presence within said second adapted detection radius 15".

Moreover, corresponding to the determined conditions of said second condition, the second adapted detection radius 15" is smaller than the initial detection radius 14. This is advantageous, because due to a reduced detection radius to the second adapted detection radius 15", undesired triggers from remote parts of the detection area (or: region) spanned by the initial detection radius 14 may be eliminated, hence adding more robustness and accuracy to the presence detection. Thus, false negatives occurring at the edges of the detection area spanned by the initial detection radius 14 may be prevented and/or eliminated.

Here, the second adapted detection radius 15" is one meter smaller than the initial detection radius 14, but may alternatively be any other measure smaller, such as at least halve a meter, at least two meter, or at least three meter. In embodiments, the second adapted detection radius may be a minimum detection radius predefined for the presence sensor.

FIG. 1D depicts schematically, by non-limiting example, the lighting system 100 according to the embodiment depicted in FIG. 1A. The presence sensor 12 is arranged for detecting presence within a (current) detection radius. The presence to be detected is of a person 16''' in said space on said floor 19.

The detection radius of the presence sensor 12 is initially set to an initial detection radius 14. The person 16''' is however at the edge regions of the initial detection radius 14 of the presence sensor 12, which leads to the person 16''' being occasionally detected. Thus, the controller 10 and the presence sensor do not continuously detect (or: determine the presence of) said person 16'''. This may lead to an undesired non-continuous and occasional switching of the lighting device 11, which is a clear problem. The present invention resolves this problem.

Namely, the controller 10 determines a current lighting status of the lighting device 11. The current lighting status of the lighting device 11 is indicative whether the lighting device 11 provides a lighting characteristic 13'''. Here, the lighting characteristic 13''' is a particular intensity, but may alternatively be any other lighting characteristic mentioned in the application. Here, the lighting device 11 provides said particular intensity. The lighting device 11 is namely triggered for the hold time duration as the person 16''' has been (occasionally) detected (or determined) within the initial detection radius 14. Therefore, the current lighting status of the lighting device 11 is indicative of the lighting device 11 providing said lighting characteristic 13'''.

However, since said person 16''' is at the (inaccurately sensing) edge region of the initial detection radius 14, the person 16''' is subsequently not detected anymore, whilst the person 16''' is still there. This is a clear false negative. Such false negatives may be common to the operation of presence sensors. This behavior causes the mentioned undesired non-continuous and occasional switching of the lighting device 11, which needs to be resolved.

Hence, considering the above, a current presence detection status, which is indicative whether presence is detected within an initial detection radius 14 of the presence sensor 12, is indicative of presence not being detected (or: determined) within the initial detection radius 14 of the presence sensor 12.

Therefore, the lighting controller 10 determines a third condition, because the current lighting status of the lighting device 11 indicates that lighting device 11 provides the lighting characteristic 13''', but the current presence detection status indicates that the presence of the person 16" is not being detected within the initial detection radius 14 of the presence sensor 12.

Upon determining this third condition, the lighting controller 10 adapts the initial detection radius 14 of the presence sensor 12 to a third adapted detection radius 15''' in which presence is (now) to be detected (or: determined). Thus, the detection area spanned by the initial detection radius 14 is adapted to a third adapted detection area spanned by the third adapted detection radius 15'''. Thus, the presence sensor 12 is now arranged to detect presence within said third adapted detection radius 15'''.

Moreover, corresponding to the determined conditions of said third condition, the third adapted detection radius 15''' is smaller than the initial detection radius 14. This is advantageous, because due to a reduced detection radius to the third adapted detection radius 15''', non-continuous and occasional triggers from remote parts of the detection area (or: region) spanned by the initial detection radius 14 may be eliminated, hence adding more robustness and accuracy to the presence detection.

Here, the third adapted detection radius 15''' is one meter smaller than the initial detection radius 14, but may alternatively be any other measure smaller, such as at least halve a meter, at least two meter, or at least three meter. In embodiments, the third adapted detection radius may be a minimum detection radius predefined for the presence sensor.

Thus, false negatives occurring at the edges of the detection area spanned by the initial detection radius 14 may be prevented and/or eliminated, thereby resolving the problem of non-continuous and occasional switching of the lighting device 11. Such behavior is particularly advantageous for if the lighting system is applied in relation with a lighting installation implementing the concept of granular dimming, because the Field-of-View (or detection region, or detection area) of presence sensors in granular dimming are overlapping, hence the correct presence detected for one presence sensor (and associated lighting device) may lead to undesired triggering of an adjacent presence sensor (and associated lighting device).

In embodiments (not depicted), but still referring to the embodiments depicted in FIG. 1A-D, the lighting controller may additionally be configured to set the mentioned hold time for the lighting device, i.e. the hold time during which the lighting device is controlled to provide the lighting characteristic, to a duration that is proportional to a size of the adapted detection radius. Thus, the larger the detection radius (or: range) the longer the hold time duration, and vice versa.

In embodiments (not depicted), but still referring to the embodiments depicted in FIG. 1A-D, the presence sensor is a range sensor. The range sensor is configured to determine a distance (relative to the range sensor) at which the presence is detected within the detection radius. Therefore, in embodiments, the lighting controller may further be configured to: determine a current distance relative to the range sensor at which the presence is detected within the detection radius of the range sensor. The lighting controller is then configured to determine the current presence detection status indicative whether the presence is detected within an initial detection radius of the presence sensor by e.g. comparing whether the current distance falls within the bounds of the initial detection radius. The lighting controller is further configured to adapt the initial detection radius of the presence sensor to an adapted detection radius in which a presence is to be detected based on said current distance, the current lighting status of the lighting device and the current presence detection status.

Figure 2:
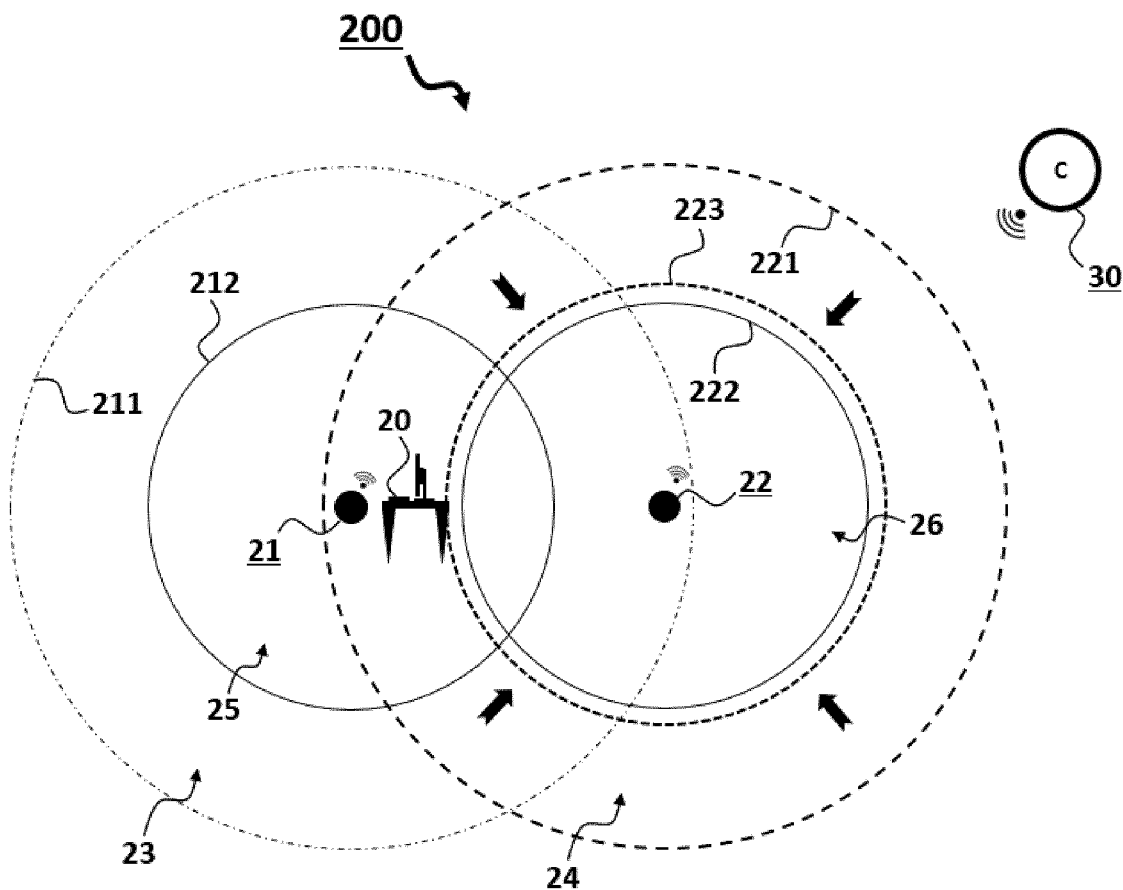
FIG. 2 depicts schematically an embodiment of a lighting installation according to the invention

FIG. 2 depicts schematically, by non-limiting example, a lighting installation 200. The lighting installation 200 comprises a first lighting assembly 21 and a second lighting assembly 22. The first lighting assembly 21 and the second lighting assembly 22 each comprises a respective lighting device (not explicitly depicted) and a respective presence sensor (not explicitly depicted). Said lighting device illuminates at least part of the detection range (or: detection area, or: detection range) of said presence sensor, for example like described for the embodiments depicted in FIGS. 1A-D.

The lighting installation 200 also comprises a lighting controller 30. The lighting controller 30 is in wireless connection and/or wireless communication with the first lighting assembly 22 and the second lighting assembly via ZigBee. Alternatively, said wireless connection may be a wired connection, and said ZigBee may be at least one of: Wi-Fi, Bluetooth, RF, IR, VLC, Li-Fi, etc. Thereby, the lighting controller 30 is arranged to control a respective lighting device of each of the two respective lighting assemblies 21, 22 in response to a presence determined within a detection radius of the respective associated presence sensor of the respective lighting assembly 21, 22. Alternatively, said controller may at least partly be integrated in a distributed fashion in each of the lighting assemblies itself.

More specifically, referring to FIG. 2, the presence of an office worker 20 is ought to be detected, and in response thereto the correct lighting device is ought to be switched on. Therefore, the lighting installation 200 operates with the concept of granular dimming. Namely, the initial detection radius 211 of the presence sensor of the first lighting assembly 21 overlaps with the initial detection radius 221 of the presence sensor of the second lighting assembly 22.

However, the presence sensor of the first lighting assembly 21 comprises an accurate region 25 delineated by a first accurate detection radius 212 in which presence can accurately be determined; and comprises an inaccurate region 23 in the area between said first accurate detection radius 212 and the initial detection radius 211 of the presence sensor of the first lighting assembly 21. This inaccurate region 23 may lead to false negatives, leading to occasional and/or non-continuous triggering of the lighting device of the first lighting assembly 21.

Similarly, the presence sensor of the second lighting assembly 22 comprises an accurate region 26 delineated by a second accurate detection radius 222 in which presence can accurately be determined; and comprises an inaccurate region 24 in the area between said second accurate detection radius 222 and the initial detection radius 221 of the presence sensor of the second lighting assembly 22. This inaccurate region 24 may lead to false negatives, leading to occasional and/or non-continuous triggering of the lighting device of the first lighting assembly 22.

Still referring to FIG. 2, the office worker 20 is close to the center of the initial detection radius 211 of the presence sensor of the first lighting assembly 21. Thus, the office worker 20 will be accurately detected (or its presence will accurately be determined) by the presence sensor of the first lighting assembly 21. The corresponding lighting device of the first lighting assembly 21 will moreover be controlled correctly and accordingly.

However, the office worker 20 is far away from the center of the initial detection radius 221 of the second lighting assembly 22, and is therefore in the inaccurate region 24 of the presence sensor of the second lighting assembly 22. Although the office worker 20 will correctly trigger the first lighting assembly 21, the office worker may cause occasional and non-continuous switching of the lighting device of the second lighting assembly 22. This is a clear disadvantage for the working of the granular dimming concept of the lighting installation. The present invention resolves this.

Namely, the controller 30 determines a current lighting status of the lighting device of the second lighting assembly 22. Since the office worker 20 may occasionally be detected and trigger the respective presence sensor of the second lighting assembly 22, like e.g. the person being detected in the embodiment depicted in FIG. 1D, the lighting device of the second lighting assembly 22 is providing the lighting characteristic of being on.

The controller 30 further determines that the current presence detection status, which is indicative whether presence is detected within the initial detection radius 221 of the presence sensor of the second light assembly 22, is that the presence of the office worker 20 is not being detected within the initial detection radius 221 of the presence sensor of the second light assembly 22. This is because the office worker 20 is in the inaccurate region 24 of the presence sensor of the second lighting assembly 22, and consequently its presence is not detected at a particular moment in time, whilst due to the hold time the corresponding lighting device is still controlled to be on.

Therefore, the lighting controller 30 determines a third condition, because the current lighting status of the lighting device of the second lighting assembly 22 indicates that the corresponding lighting device provides the lighting characteristic of being on, but the current presence detection status indicates that the presence of the office worker is not being detected within the initial detection radius 221 of the presence sensor of the second lighting assembly 22.

Upon determining this third condition, the lighting controller 30 adapts the initial detection radius 221 of the presence sensor of the second lighting assembly 22 to a third adapted detection radius 223 in which presence is (now) to be detected (or: determined). Thus, the detection area spanned by said initial detection radius 221 is adapted to a third adapted detection area spanned by said third adapted detection radius 223. Thus, the presence sensor of the second lighting assembly 22 is now arranged to detect presence within said third adapted detection radius 223.

This is advantageous, because the office worker 20 does not fall within the adapted detection radius 223 of the second lighting assembly 22. Hence, the office worker 20 will not occasionally trigger the lighting device of the second lighting assembly 22 anymore. This provides robustness to the lighting installation 200.

The behavior of the lighting systems provided in the embodiment depicted in FIGS. 1A-D may mutatis mutandis be applied in the lighting installation depicted in FIG. 2.

Figure 3:
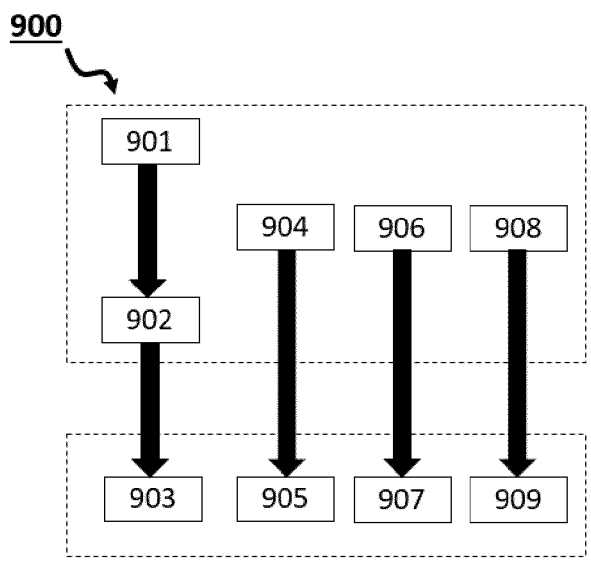
FIG. 3 depicts schematically an embodiment of a method according to the invention.

FIG. 3 depicts schematically, by non-limiting example, an embodiment of a method 900 of controlling a lighting device in response to a presence detected within a detection radius of a presence sensor. The method 900 may be performed by the lighting controller, the lighting system and/or the lighting assemblies of the embodiments depicted in the FIGS. 1A-D and FIG. 2.

The method 900 comprises a first step 901 of determining a current lighting status of the lighting device indicative of whether the lighting device provides a lighting characteristic; and a second step 902 of determining a current presence detection status indicative of whether the presence is detected within an initial detection radius of the presence sensor. The method 900 further comprises a third step 903 of adapting the initial detection radius of the presence sensor to an adapted detection radius in which a presence is to be detected based on the current lighting status of the lighting device and the current presence detection status.

More specifically, the method 900 comprises a sub step 904 of determining a first condition if (i) the current lighting status of the lighting device is indicative of the lighting device providing the lighting characteristic, and (ii) the current presence detection status is indicative of the presence being detected within the initial detection radius of the presence sensor. The method 900 thereby comprises another sub step of 905 of adapting the initial detection radius of the presence sensor to a first adapted detection radius in which a presence is to be detected upon determining said first condition, wherein the first adapted detection radius is larger than the initial detection radius.

Additionally and/or alternatively, the method 900 comprises a sub step 906 of determining a second condition if (i) the current lighting status of the lighting device is indicative of the lighting device not providing the lighting characteristic, and (ii) the current presence detection status is indicative of the presence not being detected within the initial detection radius of the presence sensor. The method 900 thereby comprises another sub step 907 of adapting the initial detection radius of the presence sensor to a second adapted detection radius in which a presence is to be detected upon determining said second condition, wherein the second adapted detection radius is smaller than the initial detection radius.

Additionally and/or alternatively, the method 900 comprises a sub step 908 of determining a third condition if (i) the current lighting status of the lighting device is indicative of the lighting device providing the lighting characteristic, and (ii) the current presence detection status is indicative of the presence not being detected within the initial detection radius of the presence sensor. The method 900 thereby comprises another sub step 909 of adapting the initial detection radius of the presence sensor to a third adapted detection radius in which a presence is to be detected upon determining said third condition, wherein the third adapted detection radius is smaller than the initial detection radius.

The invention claimed is:

1. A lighting system comprising:
a lighting device,
a presence sensor, and
a lighting controller, the lighting controller being arranged for controlling the lighting device in response to a presence detected within a detection radius of the presence sensor, and the lighting controller configured to:
   determine a current lighting status of the lighting device indicative of whether the lighting device provides a lighting characteristic,
   determine a current presence detection status indicative of whether the presence is detected within an initial detection radius of the presence sensor,
   adapt the initial detection radius of the presence sensor to an adapted detection radius in which the presence is to be detected based on the current lighting status of the lighting device and the current presence detection status,
   determine a first condition if:
      (i) the current lighting status of the lighting device is indicative of the lighting device providing the lighting characteristic, and
      (ii) the current presence detection status is indicative of the presence being detected within the initial detection radius of the presence sensor, and
   adapt the initial detection radius of the presence sensor to a first adapted detection radius in which the presence is to be detected upon determining said first condition, wherein the first adapted detection radius is larger than the initial detection radius.

2. The lighting system according to claim 1, wherein the lighting controller is configured to:
   determine a second condition if (i) the current lighting status of the lighting device is indicative of the lighting device not providing the lighting characteristic, and (ii) the current presence detection status is indicative of the presence not being detected within the initial detection radius of the presence sensor;

adapt the initial detection radius of the presence sensor to a second adapted detection radius in which the presence is to be detected upon determining said second condition, wherein the second adapted detection radius is smaller than the initial detection radius.

3. The lighting system according to claim 1, wherein the lighting controller is configured to:

determine a third condition if (i) the current lighting status of the lighting device is indicative of the lighting device providing the lighting characteristic, and (ii) the current presence detection status is indicative of the presence not being detected within the initial detection radius of the presence sensor;

adapt the initial detection radius of the presence sensor to a third adapted detection radius in which the presence is to be detected upon determining said third condition, wherein the third adapted detection radius is smaller than the initial detection radius.

4. The lighting system according to claim 1, wherein the first adapted detection radius is a maximum detection radius beyond which the presence sensor is physically incapable to detect the presence.

5. The lighting system according to claim 1, wherein the first adapted detection radius is at least one meter larger than the initial detection radius; and/or wherein the second adapted detection radius is at least one meter smaller than the initial detection radius; and/or wherein the third adapted detection radius is at least one meter smaller than the initial detection radius.

6. The lighting system according to claim 1, wherein the lighting characteristic is at least one of: a light intensity, an on/off status, a color, a color temperature, a light direction, a light pattern, a light scene, a light recipe, a light modulation, a light spectrum.

7. The lighting system according to claim 1, wherein the lighting controller is configured to set a hold time during which the lighting device is controlled to provide the lighting characteristic;

wherein a duration of the hold time is proportional to a size of the adapted detection radius.

8. The lighting system according to claim 1, wherein the presence sensor comprises a constant sensitivity for detecting said presence within said detection radius.

9. The lighting system according to claim 8, wherein the presence sensor is one of: a PIR sensor, a Time-of-Flight presence sensor, a microwave sensor, an ultrasound sensor, a camera, a radiofrequency-based presence sensor, a thermopile, a single pixel thermopile.

10. A method of controlling a lighting device in response to a presence detected within a detection radius of a presence sensor, the method comprising:

determining a current lighting status of the lighting device indicative of whether the lighting device provides a lighting characteristic;

determining a current presence detection status indicative of whether the presence is detected within an initial detection radius of the presence sensor;

adapting the initial detection radius of the presence sensor to an adapted detection radius in which a presence is to be detected based on the current lighting status of the lighting device and the current presence detection status;

determining a first condition if:

(i) the current lighting status of the lighting device is indicative of the lighting device providing the lighting characteristic, and (ii) the current presence detection status is indicative of the presence being detected within the initial detection radius of the presence sensor; and adapting the initial detection radius of the presence sensor to a first adapted detection radius in which the presence is to be detected upon determining said first condition, wherein the first adapted detection radius is larger than the initial detection radius.

11. The method according to claim 10, wherein the method comprises:

determining a second condition if (i) the current lighting status of the lighting device is indicative of the lighting device not providing the lighting characteristic, and (ii) the current presence detection status is indicative of the presence not being detected within the initial detection radius of the presence sensor;

adapting the initial detection radius of the presence sensor to a second adapted detection radius in which the presence is to be detected upon determining said second condition, wherein the second adapted detection radius is smaller than the initial detection radius.

\* \* \* \* \*